US012605732B2

(12) United States Patent
Park et al.

(10) Patent No.: US 12,605,732 B2
(45) Date of Patent: Apr. 21, 2026

(54) SYSTEM FOR DEPOSITION OF MATERIAL

(71) Applicant: LG ENERGY SOLUTION, LTD.,
Seoul (KR)

(72) Inventors: Jong Goo Park, Daejeon (KR); **Ki
Hun Kim, Daejeon (KR); Kyoung Rok
Mun, Daejeon (KR); Jong Woo Shin**,
Daejeon (KR); Sung Mo Kang,
Daejeon (KR); Jae Pil Lee, Daejeon
(KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 62 days.

(21) Appl. No.: 18/565,014

(22) PCT Filed: Feb. 17, 2023

(86) PCT No.: PCT/KR2023/002328
§ 371 (c)(1),
(2) Date: Nov. 28, 2023

(87) PCT Pub. No.: WO2023/224219

PCT Pub. Date: Nov. 23, 2023

(65) Prior Publication Data

US 2024/0246106 A1      Jul. 25, 2024

(30) Foreign Application Priority Data

May 19, 2022      (EP) ..................................... 22174210

(51) Int. Cl.
B05C 5/02          (2006.01)
B05C 11/10         (2006.01)
H01M 4/04          (2006.01)

(52) U.S. Cl.
CPC ........ B05C 5/0254 (2013.01); B05C 11/1005
(2013.01); H01M 4/0404 (2013.01)

(58) Field of Classification Search
None
See application file for complete search history.

(56) References Cited

U.S. PATENT DOCUMENTS

| | | | |
|---|---|---|---|
| 2011/0287171 | A1 | 11/2011 | Seo et al. |
| 2021/0151732 | A1 | 5/2021 | Ahn et al. |
| 2021/0387223 | A1 | 12/2021 | Park et al. |

FOREIGN PATENT DOCUMENTS

| | | |
|---|---|---|
| CN | 106216171 A | 12/2016 |
| CN | 108745775 A | 11/2018 |

(Continued)

OTHER PUBLICATIONS

European Communication pursuant to Article 94(3) EPC for European Application No. 22 174 210.9, dated May 16, 2025.

(Continued)

*Primary Examiner* — Austin Murata
(74) *Attorney, Agent, or Firm* — Birch, Stewart, Kolasch
& Birch, LLP

(57) ABSTRACT

A system for depositing a material is provided. The system
includes a die for extruding the material along a principal
deposition direction through an opening of the die. The die
includes a cavity fluidly connected to the opening, and a
flow guide extending through the cavity towards the opening
for shaping a flow of the material extruded via the opening
and flowing past a side of the flow guide in the cavity. The
side of the flow guide comprises a widening side portion of
which a width of the widening side portion increases along
the principal deposition direction towards the opening.

16 Claims, 9 Drawing Sheets

(56)          References Cited

FOREIGN PATENT DOCUMENTS

| | | | |
|---|---|---|---|
| CN | 113510050 | A | 10/2021 |
| CN | 114192346 | A | 3/2022 |
| EP | 3 643 411 | A1 | 4/2020 |
| EP | 3643411 | * | 4/2020 |
| JP | 2004-864 | A | 1/2004 |
| JP | 2010-86811 | A | 4/2010 |
| JP | 2011-136291 | A | 7/2011 |
| JP | 2015-229151 | A | 12/2015 |
| JP | 2016-182576 | A | 10/2016 |
| JP | 2017-136551 | A | 8/2017 |
| JP | 2021-120148 | A | 8/2021 |
| KR | 10-1175029 | B1 | 8/2012 |
| KR | 10-2014-0051358 | A | 4/2014 |
| KR | 10-2016-0070481 | A | 6/2016 |
| KR | 10-1737683 | B1 | 5/2017 |
| KR | 10-2017-0136311 | A | 12/2017 |
| KR | 10-2021-0061578 | A | 5/2021 |
| KR | 10-2022-0059744 | A | 5/2022 |

OTHER PUBLICATIONS

European Search Report, issued in EP Application No. 22174210.9, dated Nov. 15, 2022.
International Search Report for PCT/KR2023/002328 mailed on May 24, 2023.
Written Opinion of the International Searching Authority for PCT/KR2023/002328 mailed on May 24, 2023.

* cited by examiner

[Fig. 1A]
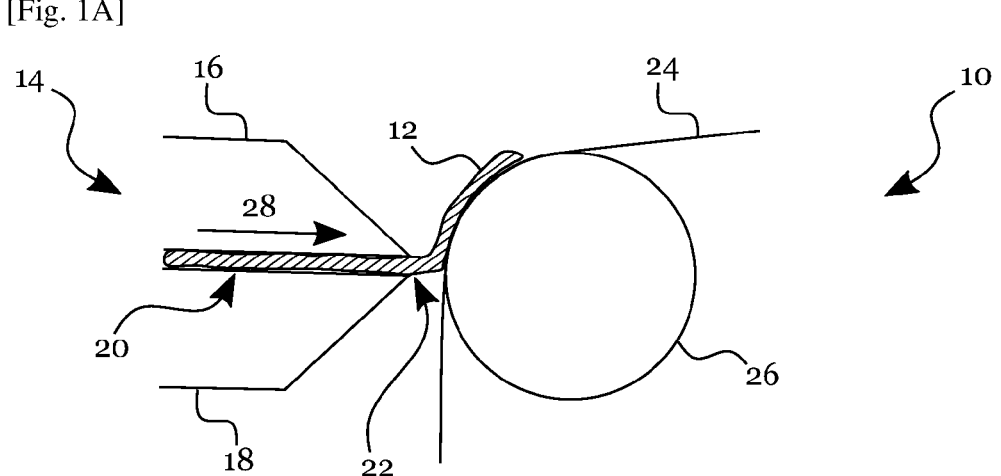
[Fig. 1B]
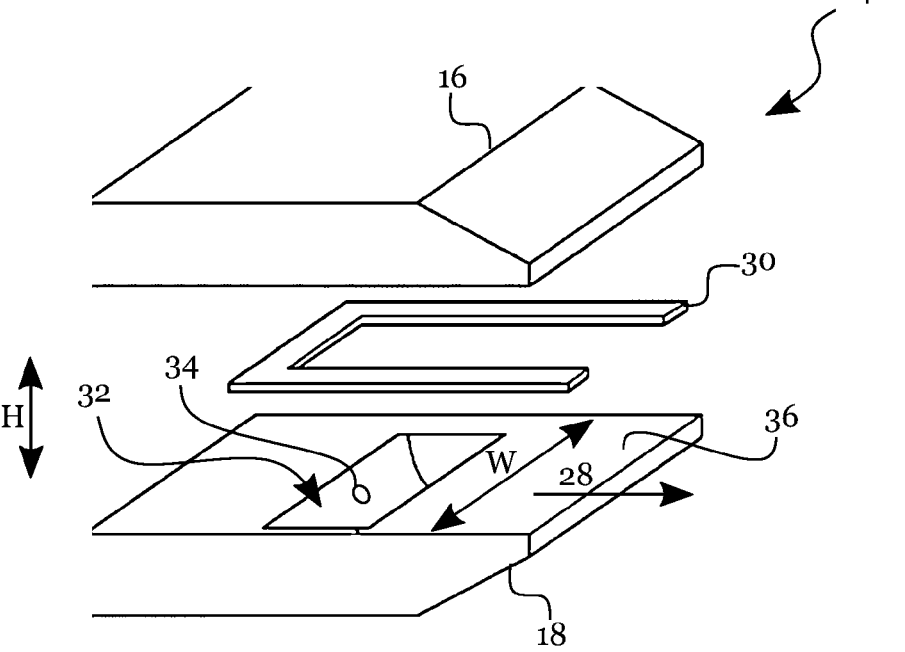

[Fig. 2]
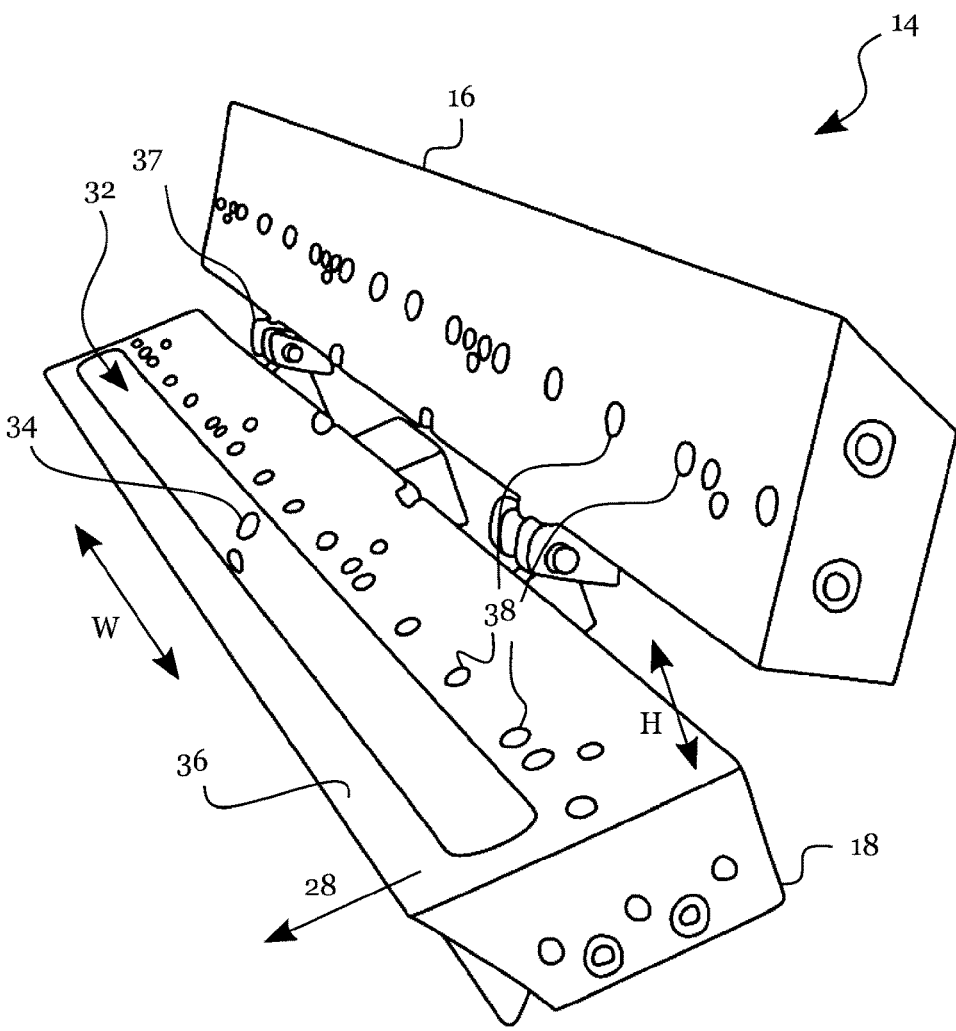
[Fig. 3A]
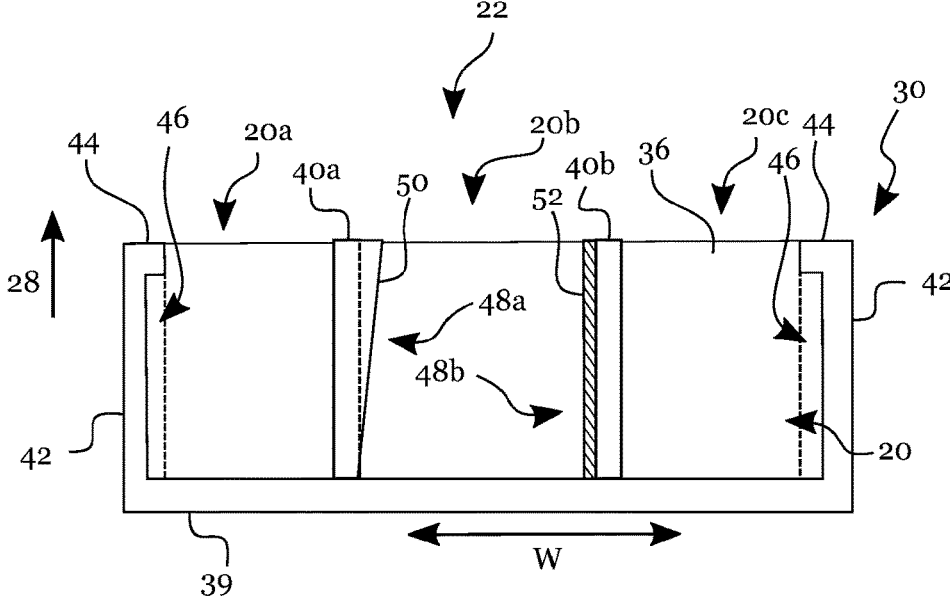

[Fig. 3B]
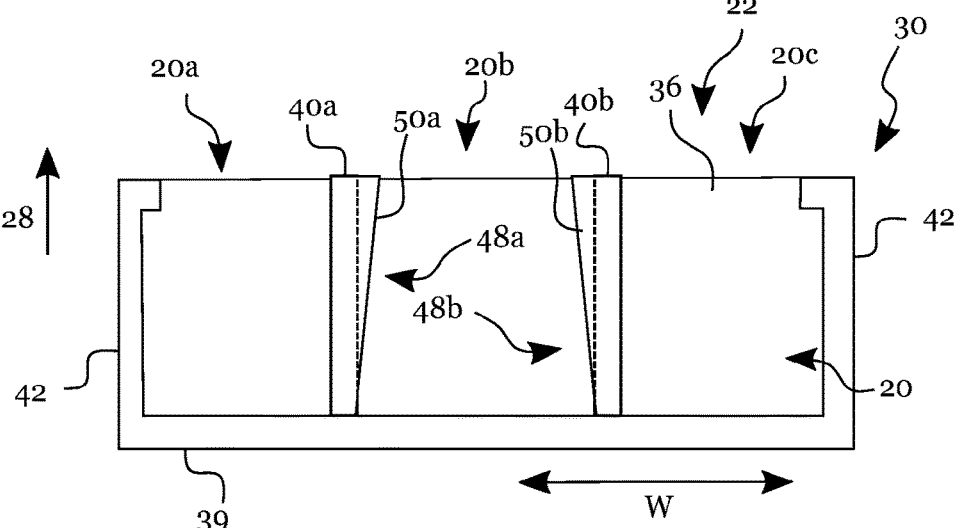
[Fig. 4A]
[Fig. 4B]
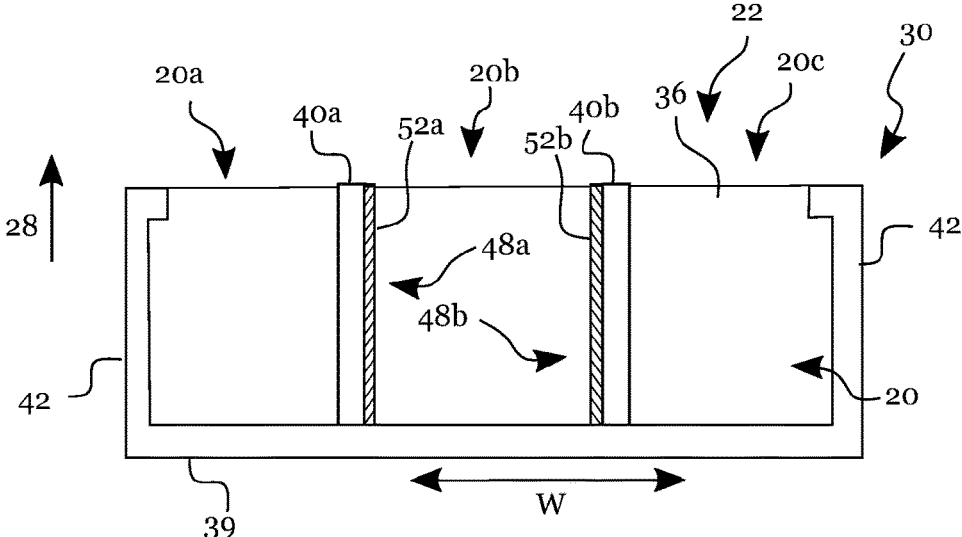

[Fig. 4C]
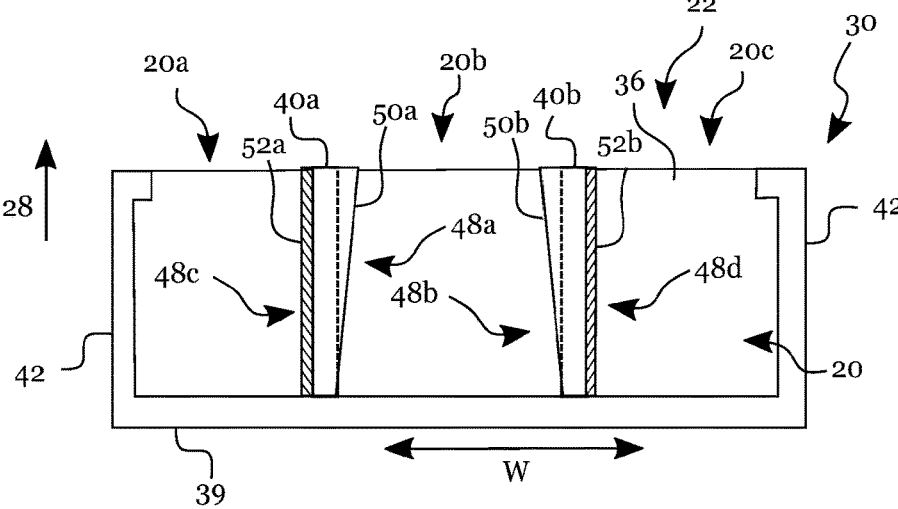
[Fig. 5A]
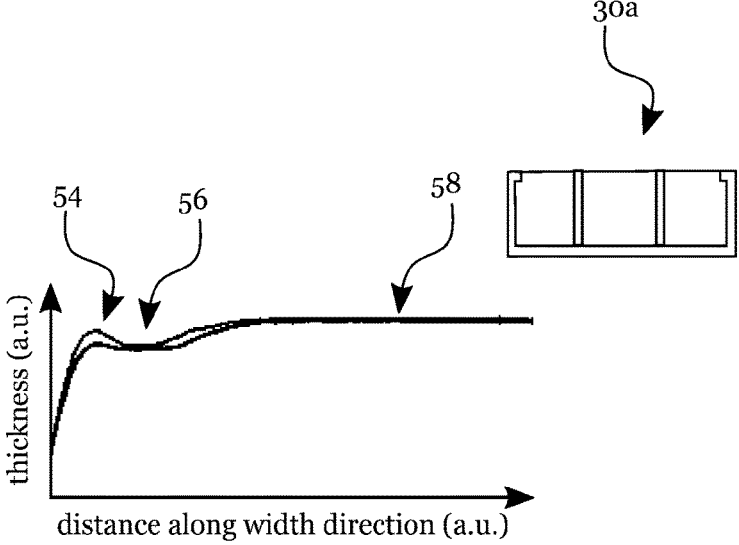
[Fig. 5B]
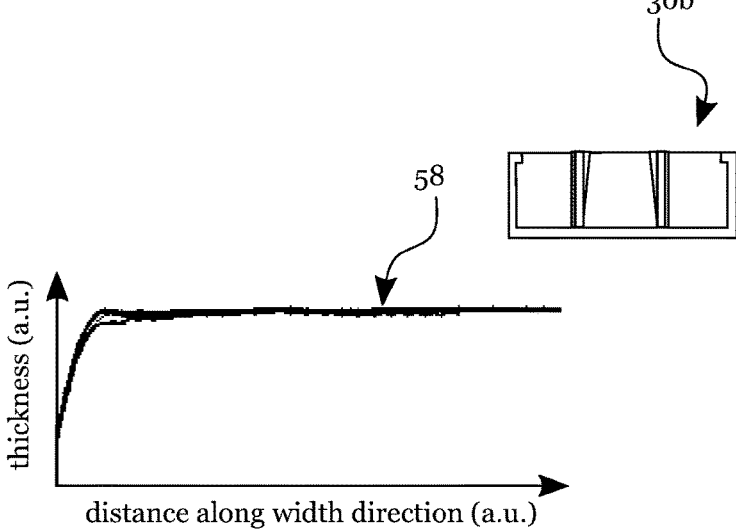

[Fig. 6A]
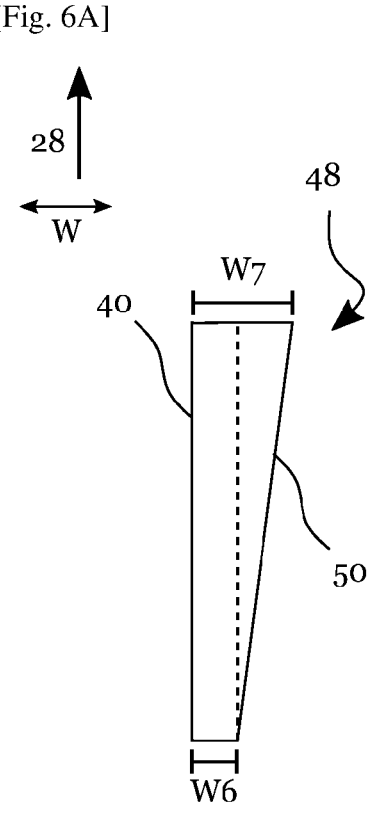
[Fig. 6B]
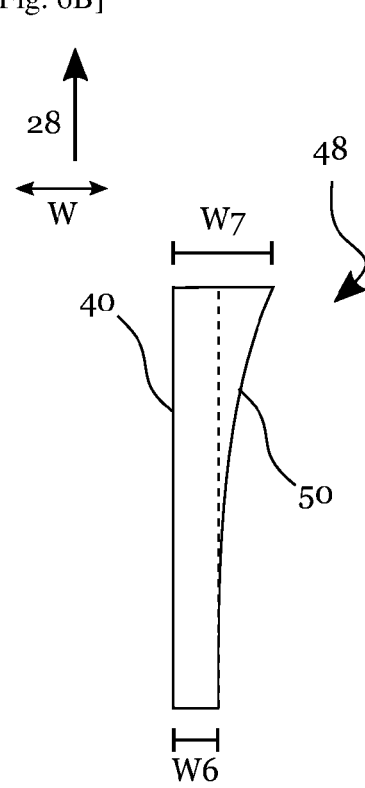

[Fig. 6C]
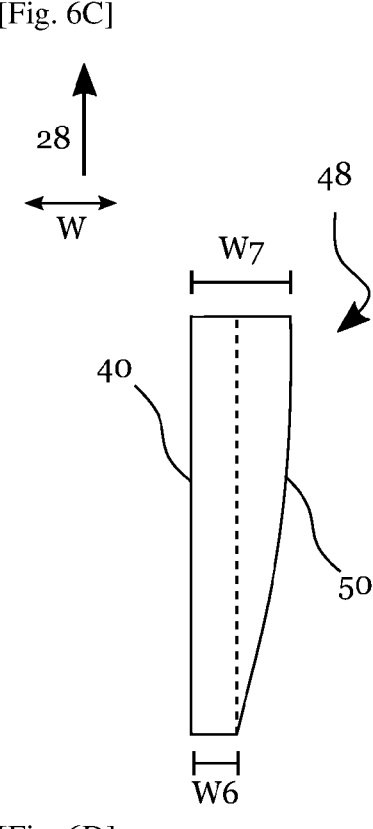
[Fig. 6D]
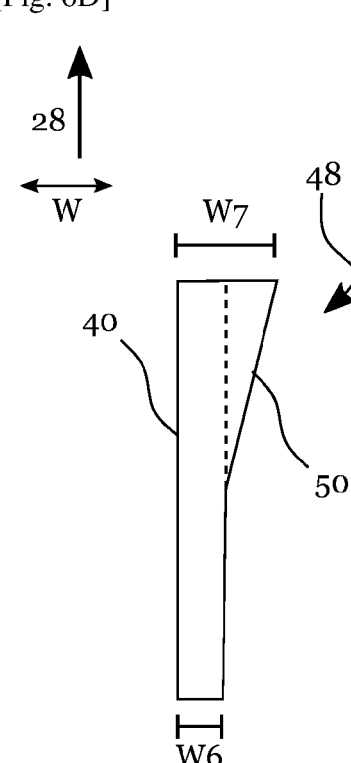

[Fig. 6E]
28
W
W7
48
40
50
W6
[Fig. 7A]
H
W
40
52
48
H2
H1
W8
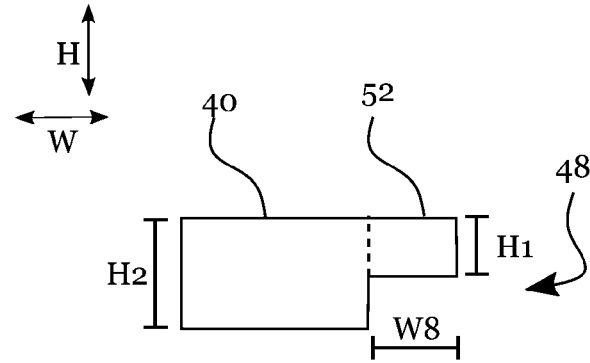
[Fig. 7B]
H
W
40
52
48
H1
W8
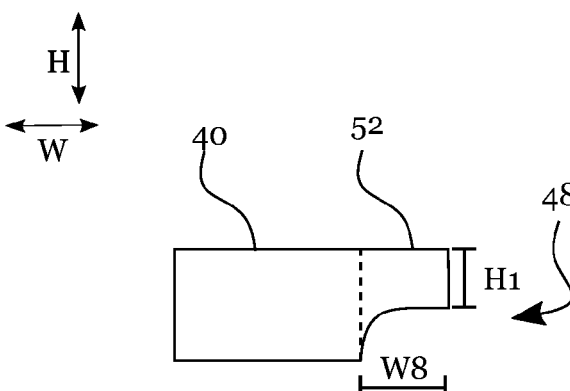

[Fig. 7C]
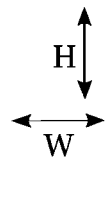
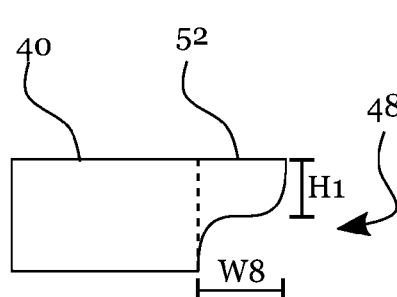
[Fig. 7D]
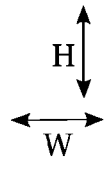
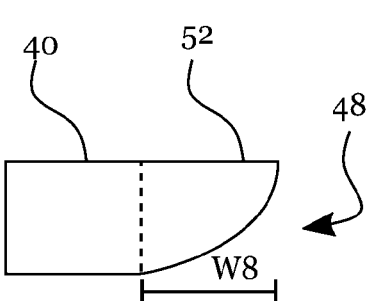
[Fig. 7E]
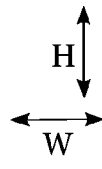
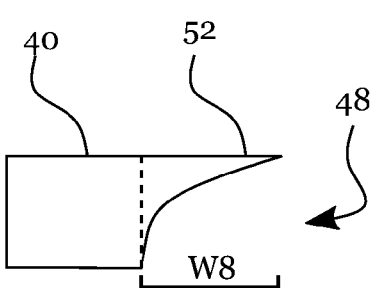
[Fig. 7F]
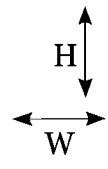
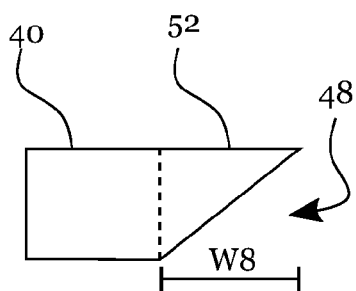

[Fig. 8]

SYSTEM FOR DEPOSITION OF MATERIAL

TECHNICAL FIELD

This application relates to deposition of a material, in particular deposition of a viscous material. The deposition may form part of a manufacturing process of a battery, in particular of a secondary battery.

BACKGROUND ART

When manufacturing a battery, such as in a manufacturing process of a secondary battery, it may be advantageous to deposit a material on a substrate having a controlled thickness profile. In particular, depending on the design configuration, it may be advantageous to deposit a material uniformly over a substrate except of one or more lines extending in the processing direction.

The material may be deposited on a foil-like substrate via a die, which may define an opening for discharging the material onto the substrate, while the substrate is moved past the opening at a controlled speed to deposit a layer of material on the substrate. For example, in a battery manufacturing process, a metal foil may be conveyed past an opening of the die and a slurry of an active material may be discharged from the opening of the die for forming an active electrode assembly.

DISCLOSURE OF INVENTION

Technical Problem

However, in the known manufacturing processes, it can be difficult to control the uniformity of a deposited material layer, which may adversely affect the properties of the final product. For example, in the case of secondary batteries, inhomogeneities of the thickness profiles of different material layers in a battery may result in local deterioration of the battery during use, e.g. when the local thicknesses of negative and positive active material layers differ in the battery, which may lead to reduced performance or premature aging of the battery.

In view of this, a technical problem may be to control the thickness profile of a deposited material on a substrate in a precise manner.

Solution to Problem

The afore-mentioned technical problems are addressed by the systems and method described below.

Provided is a system for depositing a material. The system comprises a die for extruding the material along a principal deposition direction through an opening of the die. The die comprises a cavity fluidly connected to the opening and a flow guide extending through the cavity towards the opening for shaping a flow of the material extruded via the opening and flowing past a side of the flow guide in the cavity. The side of the flow guide comprises a widening side portion, wherein a width of the widening side portion increases along the principal deposition direction towards the opening.

The die may extrude a viscous material through the opening, which may be deposited as a film onto a substrate, e.g. via relative movement of the substrate and the die. For example, the substrate may be moved past the die, e.g. on a conveying system, and the viscous material may be continuously extruded via the opening of the die for forming a layer of material on the substrate. In some examples, the system further comprises a unit, such as a coating roll, to convey a substrate, such as a metal foil, on which the material is to be deposited.

The opening may define a flow area for extruding the material from the die. The opening may be substantially perpendicular to the principal deposition direction and may be associated with a width, which may control a width of the layer of the material deposited on the substrate, and a height perpendicular to the width. The opening may be elongated along the width direction, e.g. the width of the opening may be at least an order of magnitude larger than the height of the opening. The height of the opening may be substantially constant along the width direction.

The cavity may be formed in the die for receiving the material and may guide the material towards the opening along the principal deposition direction. The cavity itself may refer to a hollow space within the die, and the cavity may be considered as a structural feature of the system and/or the cavity wherever appropriate. A height of the cavity may be greater than or of the same height as the height of the opening. For example, the die may comprise an upper die portion and a lower die portion, defining respective upper and lower die lips, and the cavity may be formed between the upper die portion and the lower die portion, wherein the upper die portion and the lower die portion may be spaced by the height of the cavity. A length of the cavity may be larger than the height of the cavity and in particular larger than the height by an order of magnitude. Accordingly, the material may flow through the cavity in a sheet-like manner, wherein the flow of the material is substantially parallel along the principal deposition direction and a thickness of a deposited layer of the material on the substrate may depend on the height of the cavity.

The flow guide may extend through the cavity towards the opening along the principal deposition direction for shaping the flow of the material towards the opening. The flow guide may constrict the flow area of the material in the cavity and/or through the opening, by physically obstructing a portion of the cavity and/or the opening. The material may be received in the cavity and may drive a flow of the material through the cavity towards the opening along the principal deposition direction. The flow of the material may be shaped by the flow guide, e.g. by defining (lateral) boundary conditions for the flow through the cavity with the flow guide. For example, the material may be forced to flow past the flow guide, wherein the flow guide may constrict a stream of material along the width direction. The flow guide may be elongated along the principal deposition direction.

In some examples, the height of the flow guide corresponds to a height of the cavity and/or the opening, such that the flow guide may define or delimit a corresponding deposition area of the die along the width direction. For example, the flow guide may delimit the cavity along the width direction or may separate two portions of the cavity and/or two portions of the opening along the width direction, such that the material may be guided according to two streams of material on opposite sides of the flow guide. In some examples, the flow guide functions as a spacer for spacing the upper die portion and the lower die portion of the die by the height of the cavity and/or the opening. However, in some examples, the height of the flow guide is smaller than a height of the cavity, such that the flow guide may only partially obstruct the cavity when viewed along the principal deposition direction.

The flow profile of the material shaped by the flow guide may result in an extrusion of separate layers of material by the die, wherein the separate layers may be spaced along the width direction of the opening, e.g. to be deposited as neighboring tracks of the material on the substrate. In other words, the flow guide may define a gap in a deposited material layer on the substrate, wherein the gap is arranged at a position corresponding to the position of the flow guide in the cavity along the width direction.

The flow guide may define respective edges of the separate layers of the material extruded via the opening, and the side of the flow guide may accordingly define a flow profile of the material flowing along the principal deposition direction. A plurality of flow guides may be provided in the cavity, such as to extrude a plurality of tracks of the material spaced along the width direction, with gaps between the tracks distributed according to the positions of the flow guides along the width direction.

The skilled person will appreciate that depending on the geometry of the cavity and the inflow of material into the cavity, the flow profile of the material will develop according to the boundaries of the cavity and the opening. The boundaries of the cavity may impose a spatially varying flow profile of the material through the cavity, wherein the direction and or velocity of the flow of the material may be spatially dependent. The flow profile may define a flow rate of the material along the width direction and may therefore influence a thickness profile of the material extruded via the opening along the width direction. The principal deposition direction may be the average direction along which the material is driven to flow through the cavity and/or along which the material is extruded through the opening.

The flow guide may at least partially define boundary conditions in the cavity and may at least locally affect the flow profile of the material flowing through the cavity towards the opening. In particular, the side of the flow guide may laterally delimit a portion of the cavity along the width direction for shaping the flow of the material along the principal deposition direction, at least close to the flow guide. The geometry of the side of the flow guide, past which the material flows along the principal deposition direction, may control the local flow profile of the material in the cavity. A thickness profile of the material extruded via the opening along the width direction, may thus depend on the geometry of the side at least in the vicinity of the flow guide.

In the system, the flow guide comprises a side with a widening side portion, wherein a width of the widening side portion increases along the principal deposition direction. For example, at least a portion of the side of the flow guide may feature a slope with respect to the principal deposition direction, such as to direct a flow of the material with a side extending at an angle with respect to the principal deposition direction. The widening side portion may locally impose flow components of the material away from the flow guide, e.g. when compared to a flow guide with a side extending parallel to the principal deposition direction, which may increase a homogeneity of the deposited material layer on the substrate close to the position of the flow guide along the width direction. In particular, the widening side portion may reduce a variation of the thickness of the deposited material close to an edge of the layer of the material on the substrate.

In some examples, the widening side portion is at or close to the opening and may in particular extend along the entire side of the flow guide.

The widening side portion may be arranged along the flow guide at a portion of the flow guide close to the opening with respect to the principal deposition direction. Close to the opening, the flow guide may control the flow profile of the material exiting the cavity, and the shape of the flow guide may define an exit flow profile close to the edge of a stream of material defined and/or delimited by the flow guide. The widening side portion may extend over more than 30%, more than 50%, or more than 75% of the length of the flow guide in the cavity along the principal deposition direction or substantially the entire length of the flow guide in the cavity, e.g. measured from a feed port for feeding the material into the cavity or from an end of the cavity opposite the opening.

In some examples, the width of the widening side portion monotonically increases towards the opening. In particular, the width of the widening side portion may increase according to a smooth function, and preferably according to a convex, linear, or concave function, along the principal deposition direction.

The side of the flow guide should be smooth at least close to the opening, such as to avoid an irregular flow profile of the material in the cavity, e.g. for avoiding nonlinear flow conditions or turbulence for the flow of the material through the cavity. As used herein, the term smooth may be understood as a differentiable function, as opposed to the stricter mathematical definition. However, the skilled person will appreciate that minor unevenness of the side may be effectively smoothed out by fluid resistance, e.g. for laminar flow conditions, such that in some examples, a profile of the side may only be substantially smooth or may only be smooth close to the opening.

In some examples, the side is inclined with respect to the principal deposition direction, such that the width of the widening side portion linearly increases towards the opening.

Accordingly, the side may define a slope with respect to the principal deposition direction, such that the flow guide may direct a flow past the side at an angle to the principal deposition direction, and the material may be directed away from the flow guide.

In some examples, the side comprising the widening side portion faces towards a center of the die.

In other words, the widening side may be on a side of the flow guide facing the center of the die with respect to the width direction. For example, when the material is received from a feed port at a center of the die, the widening side may face the feed port at which the material is received in the cavity.

In some examples, the or another side of the flow guide comprises a recessed side portion, such that a thickness of the flow guide in the recessed side portion is smaller than a center thickness of the flow guide in a center of the flow guide, wherein the side comprising the recessed side portion may in particular be an opposite side to the side comprising the widening side portion.

For example, flow guide may comprise a widening side on one side of the flow guide and a recessed side portion on the opposite side of the flow guide. The recessed side portion may reduce a flow area through the cavity towards the opening, but may define a larger flow area than a center portion of the flow guide when viewed along the principal deposition direction. For example, the flow guide may comprise a protrusion protruding from the side of the flow guide, which may partially obstruct the cavity for reducing a flow rate of the material towards the opening in the recessed side portion.

Accordingly, the recessed side portion may control the flow profile of the material in a similar or opposite manner as the widening side portion for improving a homogeneity of the deposited layer of material. In some examples, the recessed side portion faces away from a feed port at which the material is received in the cavity.

In some examples, the widening side portion overlaps with a recessed side portion, such that a thickness of the flow guide in the widening side portion is smaller than a center thickness of the flow guide in a center of the flow guide.

The system may comprise flow guides comprising both a widening and a recessed side portion or may comprise flow guides with only widening side portions or only recessed side portions.

Accordingly, a system for depositing a material is provided. The system comprises a die for extruding the material along a principal deposition direction through an opening of the die. The die comprises a cavity fluidly connected to the opening, and a flow guide extending through the cavity towards the opening for shaping a flow of the material extruded via the opening and flowing past a side of the flow guide in the cavity. The side of the flow guide comprises a recessed side portion, such that a thickness of the flow guide in the recessed side portion is smaller than a center thickness of the flow guide in a center of the flow guide.

However, as discussed above, the system may also comprise a flow guide comprising the widening side portion and/or the flow guide comprising the recessed side portion may further comprise a widening side portion.

In some examples, the recessed side portion is at or close to the opening and in particular extends along the entire side of the flow guide.

In some examples, a cross-section of the flow guide at the recessed side portion may comprise a linear incline, a convex shape, a concave shape, and/or a step towards an intermediate thickness with respect to the center thickness of the flow guide.

The cross section may be a cross section perpendicular to the principal deposition direction. The step may be a protrusion protruding from the side of the flow guide which partially obstructs the cavity for reducing a flow rate of the material towards the opening in the recessed side portion. However, the recessed side portion may also comprise a smooth function when viewed along the principal deposition direction, such as the convex or concave shape, or the linear incline effectively forming a trapezoid cross-section in the recessed side portion.

In some examples, the recessed side portion faces away from a center of the die.

The recessed side portion may increase flow velocities of the material towards the flow guide for material flowing past the side of the flow guide in the vicinity of the flow guide. Accordingly, when a feed port for feeding the material into the cavity is arranged in the center of the die, the recessed side portion may correct for a potential pressure gradient through the cavity.

In some examples, the die comprises a manifold communicating with the cavity for distributing the material over a width direction of the die, the width direction being perpendicular to the principal deposition direction, and a feed port communicating with the manifold for providing the material to the manifold.

The manifold may be formed by a recess in the die, e.g. in one or both of the lower die portion and the upper die portion, which may be elongated along the width direction of the die, such that material fed into the cavity may be distributed along the width direction of the die by the manifold. For example, a feed port may connect a material inflow to the manifold, such that the material is received in the manifold and distributed over the width direction, and the material may flow out from the manifold towards the opening with a substantially homogeneous flow profile. The feed port may be formed by a through bore through one of the upper die portion and the lower portion, for feeding the material into the manifold and/or the cavity.

In some examples, the system comprises a guide plate provided as a separate piece from the die, the guide plate comprising a support portion and the flow guide, wherein the support portion is arranged inside the cavity, and the flow guide extends from the support portion to the opening of the die.

The guide plate may be a shim arranged between an upper die portion and a lower portion of the die and may act as a spacer between the upper die portion and the lower portion of the die. In other words, the guide plate may define a height of the cavity by spacing apart upper and lower halves of the die. The guide plate may delimit a back end of the cavity with the support portion along the principal deposition direction. The flow guide may extend towards the opening and, in some examples, may end before, at, or past the opening. The flow guide may laterally delimit the cavity or portions thereof.

In some examples, the flow guide is arranged in the cavity such that the material passes on opposite sides of the flow guide towards the opening, when the system extrudes the material through the opening.

The guide plate may further comprise lateral prongs arranged on opposite sides of the support portion, which may extend along the principal deposition direction towards the opening and may define the lateral limits of the cavity along the width direction. The lateral prongs may extend parallel to the flow guide and may extend up to the opening. The lateral prongs may feature hooked ends, comprising a protrusion arranged at the opening of the die and protruding towards the center of the die for shaping a flow of the material at the outer edges of an extruded material layer. The protrusion of the lateral prongs may act as a flow guide and may feature a recessed side portion for shaping a flow profile of the material out from the opening.

A plurality of interposed prongs may be arranged between the lateral prongs extending towards the opening as flow guides, and the guide plate may form a substantially comb shaped shim, which may define different sections of the cavity between neighboring interposed prongs and the lateral prongs, e.g. when the guide plate is interposed between the upper die portion and the lower die portion.

The guide plate may removable from the cavity for adjusting a deposition geometry of the material on a substrate, e.g. by exchanging the guide plate with another guide plate, which may feature a different spacing between adjacent flow guides or a different thickness.

However, in some examples, the flow guide is formed integral with one or both of the upper die portion and the lower die portion.

The system is advantageously applied to the manufacturing of a battery. A battery may generally include or be any of a primary battery, a secondary battery or more generally an electrochemical cell for energy storage, unless indicated otherwise or technically inappropriate. In particular, the battery as used herein may refer to a secondary battery, i.e., a rechargeable battery. For example, the battery may comprise one or more layers of electrodes and one or more layers of separators stacked in a specific manner. The battery may be a coin-type, cylindrical, prismatic, or pouch-type battery. Particularly, the battery may be configured to provide power to an electric vehicle. Hereinafter, a reference will be made to "a" battery, in order not to limit the subject matter to the manufacture of one particular battery. Alternatively or additionally, the battery may refer to a primary battery or non-rechargeable battery.

Reference may further be made to a battery part. The battery part may refer to any semi-finished part of a battery that may be used to manufacture a battery product. In a specific example, the battery part may refer to an electrode substrate and an active material disposed thereon. For example, the active material may be deposited and/or sprayed on the electrode substrate. The electrode substrate may be a metal foil comprising a metallic material, such as copper, nickel, or aluminum.

The active material of a battery may be provided as a viscous mixture which may be referred to as a slurry. The slurry containing the active material may be disposed on an electrode substrate, thus obtaining a battery part. The battery part may be dried, and activated optionally, to obtain an electrode for a battery, particularly for a secondary battery. For the sake of simplifying the description, the terms active material and slurry may be used interchangeably hereinafter, unless indicated otherwise or technically inappropriate, and the active material may be the material extruded via the die onto a substrate.

The slurry may refer to a viscous mixture containing a binder to which a solid active material, which may be provided for example as a granular and/or powder material, is admixed. The active material may be or contain, as a non-exhaustive list of examples, lithium-cobalt oxide (LCO), lithium nickel cobalt manganese oxide (NCM), lithium nickel cobalt aluminium oxide (NCA), lithium manganese oxide (LMO), lithium nickel manganese spinel (LNMO), lithium iron phosphate (LFP). The active material may additionally include graphite, pure lithium and/or silicon.

The slurry may additionally contain solid conductive particles, for example carbon black and/or carbon nanotubes. The slurry may additionally contain dispersants. The binder may be a polymeric binder. The binder may be or include polyvinylidene fluoride (PVDF), polymethyl acrylate (PMMA), carboxymethylcellulose (CMC), polyacrylate, xanthan gum, polyethylene glycol, or styrene butadiene. The slurry may further contain one or more liquid components. The liquid component may be or include water and/or an organic solvent, such as tetrahydrofuran (THF) or N-methyl-2-pyrrolidon (NMP).

The slurry may be disposed, particularly deposited or extruded, on an electrode substrate. The electrode substrate may be a metal foil made of one or more metal materials, such as copper, nickel, or aluminum. Manufacturing the electrode may include drying the active material disposed on the electrode.

Specifically, the afore-mentioned systems may be systems adapted to manufacture a secondary battery, wherein the material may be an active positive electrode material for the secondary battery.

The skilled person will appreciate that the material and dimensions of the die may accordingly be adapted to the handling of active material for a battery electrode and the extrusion of said active material in layers suitable for battery fabrication. In particular, the system may be capable of deposit a material that has a suitable viscosity, which may be measured, for example, using a Stabinger viscometer SVM kinematic viscometer in accordance with ASTM 7042, at an atmospheric pressure (1013.25 hPa) and 25° C. The suitable viscosity may be, for example and without being limited hereto, in a range of $10^{-3}$ Pa·s to $10^9$ Pa·s, in particular above 10–1 Pa·s, above 1 Pa·s, or above 10 Pa·s, and may be up to $10^8$ Pa·s, up to $10^7$ Pa·s or up to $10^6$ Pa·s. Specifically, the material that may be deposited using the system as disclosed herein may include, without being limited hereto, a slurry for battery manufacturing, and in particular active material deposition for active electrode fabrication.

Further, a method for manufacturing a battery with any one of the afore-mentioned systems is provided, comprising depositing a material on a substrate through the opening formed in the die.

Advantageous Effects of Invention

The uniformity of a deposited material layer on a substrate may be improved by the systems and method defined in the claims.

Also, by the system and the method, the thickness profile of a deposited material on a substrate may be controlled in a precise manner.

BRIEF DESCRIPTION OF DRAWINGS

The accompanying drawings illustrate some particular examples and are intended to help understanding the present invention. Herein and in the drawings, a same reference sign or a series of reference signs may be used in different examples to indicate a same, similar or analogical element.

FIG. 1A, 1B illustrates an example of a system for depositing a material comprising a die, according to a schematic side view;

FIG. 2 illustrates an example of a die, according to a schematic perspective view;

FIG. 3A, 3B illustrates an example of a shim for a die, according to a schematic top view, and corresponding tracks of extruded material on a substrate;

FIG. 4A-C illustrate different examples of shims featuring widening side portions according to schematic top views;

FIG. 5A, 5B illustrate examples of thickness measurements close to edges of tracks of a deposited material extruded from a die using different shims;

FIGS. 6A-6E illustrate different examples of flow guides comprising widening side portions according to schematic top views;

FIG. 7A-7F illustrate different examples of flow guides comprising recessed side portions at a side of the flow guide with cross sections of the respective shims; and FIG. 8 illustrates a further example of a shim for a die according to a schematic perspective view.

BEST MODE FOR CARRYING OUT THE INVENTION

Provided is a system for depositing a material. The system comprises a die for extruding the material along a principal deposition direction through an opening of the die. The die comprises a cavity fluidly connected to the opening and a flow guide extending through the cavity towards the opening for shaping a flow of the material extruded via the opening and flowing past a side of the flow guide in the cavity. The side of the flow guide comprises a widening side portion, wherein a width of the widening side portion increases along the principal deposition direction towards the opening.

A system for depositing a material is provided. The system comprises a die for extruding the material along a principal deposition direction through an opening of the die. The die comprises a cavity fluidly connected to the opening, and a flow guide extending through the cavity towards the opening for shaping a flow of the material extruded via the opening and flowing past a side of the flow guide in the cavity. The side of the flow guide comprises a recessed side portion, such that a thickness of the flow guide in the recessed side portion is smaller than a center thickness of the flow guide in a center of the flow guide.

A method for manufacturing a battery with any one of the afore-mentioned systems is provided, comprising depositing a material on a substrate through the opening formed in the die.

The afore-mentioned systems may be systems adapted to manufacture a secondary battery, wherein the material may be an active positive electrode material for the secondary battery.

MODE FOR THE INVENTION

FIG. 1A illustrates an example of a system 10 for depositing a material 12 comprising a die 14. The die 14 comprises an upper die member 16 and a lower die member 18 defining a cavity 20 between each other. The cavity 20 receives the material 12 and may guide the material 12 towards an opening 22 of the die 14 proximate a substrate 24. The substrate 24 may be a foil-like substrate 24 as illustrated in FIG. 1A, and may be conveyed past the opening 22 by a conveying system 26, such as the conveying roll in the illustrated example. For example, an electrode substrate 24, such as a metal foil having a thickness of about 8 μm, may be conveyed by the conveying roll past the opening 22 on a tape with a thickness of about 40 μm for structural support.

The material 12 may be extruded through the opening 22 of the die 14 over a gap onto the substrate 24 according to a principal deposition direction 28, and the material 12 may be deposited as layer of the material 12 on the substrate 24 by the combined action of extruding the material 12 and relatively moving the die 14 and the substrate 24 with respect to each other. The gap between the conveying system 26 and a tip of the die 14 may be between about 100 μm to about 300 μm, such as between about 150 μm to about 200 μm. The gap may affect a thickness of the deposited material 12, wherein a larger gap may be associated with an increased coating thickness of the material 12 on the substrate 24. For example, the thickness of the material may be approximately. The material 12 may be extruded through the opening 22 at a flow rate/velocity which may be similar or substantially the same velocity as the conveying speed of the substrate 24, but may also differ from the conveying speed of the substrate 24.

As shown in the example of FIG. 1B the die 14 may be formed by separate upper and lower die members 16, 18 spaced apart by a shim 30, which may be interposed between the upper and lower die members 16, 18 and may define the geometry of the cavity 20. In particular, the shim 30 may act as a spacer for defining a spacing along a height direction H between the upper and lower die members 16, 18 according to a height/thickness of the shim 30. The shim 30 may function as a guide plate 30 by laterally delimiting the cavity 20 in which the material 12 is received. As illustrated in the example, the shim 30 may define a back end of the cavity 20 with respect to the principal deposition direction 28, and may comprise lateral prongs extending on opposite sides of the shim 30 along the principal deposition direction 28 for delimiting the cavity along a width direction W of the die 14.

One or both of the upper and lower die members 16, 18 may comprise a manifold 32 for distributing the material 12 over the width direction W of the die 14. The manifold 32 may comprise a feed port 34 for receiving the material 12 in the cavity 20, which may be implemented with a through bore through the upper or lower die member 16, 18 into the manifold 32 for feeding the material 12 into the manifold 32.

As illustrated in the FIG. 1B, the manifold 32 may be formed by a recess in one or both of the upper and lower die members 16, 18. The recess may be dimensioned to promote a flow of the material along the width direction W with respect to a flow into the cavity 20. The manifold 32 may promote a homogeneity of the flow profile of the material 12 flowing into the cavity with respect to the width direction W, e.g. may promote substantially homogeneous flow of the material 12 along the principal deposition direction 28 with respect to different points along the width direction W.

After exiting the manifold 32, the material 12 may flow onto a land portion 36 of the upper and lower die members 16, 18, sometimes also referred to as lip, land or land part of the die 14, corresponding to a substantially flat surface of the upper and lower die members 16, 18. In the land portion 36, the cavity 20 may feature a substantially constant height along the height direction H, and the material 12 may flow substantially along the principal deposition direction 28 towards the opening 22 to be extruded onto the substrate 24.

FIG. 2 illustrates an example of a die 14 comprising upper and lower die members 16, 18 pivotally connected via hinged connectors 37. The lower die member 16 comprises a recess forming a manifold 32 of the die next to a land portion 36 of the lower dic member. A through hole connects to the manifold 32 for implementing a feed port 34 of the die 14. The lower die member 16 and the upper die member 18 feature though holes 38 at corresponding locations for holding the upper and lower die members 16, 18 against each other. A shim 30 (not shown in FIG. 2) may feature corresponding holes for aligning and holding the shim 30 in between the upper and lower die members 16, 18. The upper and lower die members 16, 18 may form a cavity 20 with the shim 30 for extruding material 12 supplied from the feed port 34 over the land portion 36 along the principal deposition direction 28.

FIGS. 3A, 3B illustrate an example of a shim 30 for a die 14 of a system 10 for extruding material 12 onto a substrate 24. The shim 30 comprises a support portion 39, a plurality of flow guides 40a, 40b and lateral prongs 42 arranged at opposite sides of the support portion 39. The support portion 39 may be elongated along the width direction W and may feature a substantially straight shape. The support portion 39 may comprise through holes (not shown) for mounting the shim 30 in a die 14, e.g. between die members 16, 18.

The lateral prongs 42 and the flow guides 40a, 40b extend from the support portion 39 along the principal deposition direction 28, such as to extend over a land portion 36 towards an opening 22 of the die 14, when the shim 30 is mounted between upper and lower die members 16, 18 of the die 14. The flow guides 40a, 40b are implemented as interposed prongs arranged between the lateral prongs 42 and can partially obstruct a cavity 20 formed between the die members 16, 18, such as to shape a flow of the material 12 extruded via the opening 22.

The lateral prongs 42 are arranged on opposite sides of the support portion 39 and protrude parallel to the flow guides 40a, 40b up to the opening 22. The lateral prongs 42 may define the lateral limits of the cavity 20 along the width direction W and may comprise hooked ends. The hooked ends may be formed by a lateral protrusion 44 protruding from the lateral prongs 42 at an end of the lateral prongs next to the opening 22. The lateral protrusion 44 may extend along the width direction W, such as to define a lateral side cavity 46 (indicated by dashed line) of the cavity 20. The hooked ends may improve a thickness profile of deposited material 12 next to lateral edges of a deposited layer of material 12.

In some manufacturing process including a deposition of a viscous material 12, the homogeneity of the thickness profile of the material 12 on the substrate 24 may be a quality indicator for a to be fabricated product. For example, in the manufacturing of a battery, the thickness profile of active electrode material may affect the lifetime and performance of the battery, which will be discussed in the following examples.

In particular, in the manufacturing of a battery, it can be desirable to form a material layer on a substrate 24 with a plurality of tracks 12a, 12b, 12c with predefined widths W1-W3, as schematically illustrated in FIG. 3B. The tracks 12a-c may be defined by gaps G1, G2 between adjacent material layers 12a-c, spacing the material layers by spacings W4, W5. The tracks 12a-c may be a plurality of tracks 12a-c of active material 12 on a metallic electrode substrate 24, such as a metal foil. The tracks 12a-c may be formed according to parallel streams of extruded material distributed along the width direction W of the die 14.

The shape and location of the gaps G1, G2 between the tracks 12a-c may be defined by the flow guides 40a, 40b of the shim 30. Specifically, the flow guides 40a, 40b may at least partially obstruct the cavity 20, such as to define adjacent cavity sections 20a-c through which respective streams of material 12 may flow towards the opening 22.

However, the flow guides 40a, 40b may disturb the boundary conditions of the cavity 20 for shaping a homogeneous flow of the material 12 towards and out of the opening 22, such that the separation of the flow of the material 12 into a plurality of streams through the cavity sections 20a-c may reduce a homogeneity of the thickness profile of the deposited material 12, in particular close to edges of the tracks 12a-c, e.g. near the gaps G1, G2.

As illustrated in FIG. 3A, a side 48a of the flow guide 40a is provided with a widening side portion 50. The width of the widening side portion 50 increases along the principal deposition direction 28 towards the opening 22 according to a linear function, thereby defining a sloped side 48a with respect to the principal deposition direction 28. In other words, the side 48a of the flow guide 40a may define an angle different from 0° with the principal deposition direction 28, such that a width of an adjacent cavity section 20b may decrease along the principal deposition direction 28 according to sloped side 48a of the flow guide 40a.

The sloped side profile of the side 48a of the flow guide 40a may introduce a transverse flow component in the flow of the material 12 through the adjacent cavity section 20b for material 12 flowing past the side 48a of the flow guide 40a in its vicinity. The transverse flow component in the flow of the material 12 may affect an exit flow profile of the material 12 through the opening 22, such that the material 12 exits the opening 22 with a volumetric flow rate having a higher homogeneity close to the edge of the cavity section 20b defined by the flow guide 40a. Accordingly, the thickness profile of a deposited layer of material 12 may feature increased homogeneity close to a corresponding edge of a material track 12b.

Further, a side 48b of the other flow guide 40b is provided with a recessed side portion 52 (illustrated by hatch pattern), wherein a thickness of the flow guide 40b in the recessed side portion 52 may be reduced with respect to a thickness of the flow guide 40b in a center portion of the flow guide 40b. In other words, the cavity section 20b adjacent to the side 48b of the flow guide 40b may partially protrude into a space occupied by the flow guide 40b over a width defined by the recessed side portion 52, when viewed along the principal deposition direction 28. The recessed side portion 52 may accordingly be defined by a protruding portion protruding along the width direction W from the flow guide 40b, e.g. when considering a cross section through the flow guide 40b along the principal deposition direction 28 at the recessed side portion 52.

A flow area along the principal deposition direction 28 for material 12 flowing towards the opening 22 in the recessed side portion 52 may be reduced with respect to a flow area of a center of the adjacent cavity section 20b, but may be greater than a flow area at a center of the flow guide 40b, with respect to the width direction W. Accordingly, a volumetric flow rate of the material 12 through the recessed side portion 52 towards the opening 22 may be reduced with respect to a volumetric flow rate of the material 12 in the center of the adjacent cavity section 20b.

Both the widening side portion 50 and the recessed side portion 52 of the flow guides 40a, 40b may increase a homogeneity of the thickness profile of the material 12 deposited on the substrate close to outer edges of the tracks 12a-c of the material 12. The widening side portion 50 and the recessed side portion 52 may be used individually or in combination in some examples.

FIG. 4A-4C illustrate different examples of shims 30 featuring widening side portions 50, 50a, 50b and recessed side portions 52, 52a, 52b arranged at different sides 48a-d of flow guides 40a, 40b with a shim geometry similar to the example illustrated in FIG. 3A.

FIG. 4A illustrates an example of a shim 30 in which two flow guides 40a, 40b are adjacent to and define a common cavity section 20b. Each of the two flow guides 40a, 40b comprises a widening side section 50a, 50b, arranged on respective sides 48a, 48b of the flow guides 40a, 40b bordering the common adjacent cavity section 20b. The sides 48a, 48b comprising the widening side portions 50a, 50b face each other and face towards a center of the shim 30, such as to face towards a feed port 34 of the die 14, when the shim 30 is used in conjunction with upper and lower die members 16, 18, e.g. the upper and lower die members 16, 18 of the examples shown in FIGS. 1A-2.

In the illustrated example, both widening side portions 50a, 50b are implemented with a sloped profile of the respective sides 48a, 48b, such that the cavity section 20b defined between the flow guides 40a, 40b narrows towards the opening 22 along the principal deposition direction 28. Accordingly, a thickness profile of the track 12b corresponding to the cavity section 20b may be improved at both edges.

FIG. 4B illustrates an example, in which both flow guides comprise recessed side portions 52a, 52b, arranged to face each other at facing sides 48a, 48b of the flow guides 40a, 40b. In other words, the common cavity section 20b delimited by the flow guides 40a, 40b may be (partially) widened on both sides along the width direction W according to a cross section of the recessed side portions 52a, 52b of the adjacent flow guides 40a, 40b, when viewed along the principal deposition direction 28.

The skilled person will appreciate that the examples of FIGS. 4A and 4B may be combined, e.g. by providing flow guides 40a, 40b with sloped side profiles and recessed side portions 52a, 52b on the same sides 48a, 48b of the flow guides 40a, 40b, such that the flow guides 40a, 40b may each comprise both a widening side portion 50a, 50b and a recessed side portion 52a, 52a, which may overlap on the same sides 48a, 48b of the flow guides 40a, 40b. As another example, both sides 48*a*, 48*c* of a flow guide 40*a* may comprise a widening side portion 50*a*, 50*b* and/or a recessed side portion 52*a*, 52*b*.

FIG. 4C illustrates a further example of a shim 30, in which two flow guides 40*a*, 40*b* are provided with widening side portions 50*a*, 50*b* at facing sides 48*a*, 48*b* of the flow guides 40*a*, 40*b*, similar to the example of FIG. 4A. In addition, each of the flow guides 40*a*, 40*b* further comprises recessed side portions 52*a*, 52*b* arranged on sides 48*c*, 48*d* opposite to the respective sides 48*a*, 48*b* comprising the widening side portions 50*a*, 50*b*, and facing away from a center of the shim 30. In other words, each of the flow guides 40*a*, 40*b* comprises a side 48*a*, 48*b* featuring a widening side portion 48*a* and facing the center of the shim 30, and comprises another side 48*c*, 48*d* featuring a recessed side portion 52*a*, 52*b*, wherein the another side 48*c*, 48*d* is opposite the side 48*a*, 48*b* featuring the widening side portion 50*a*, 50*b*.

The flow guides 40*a*, 40*b* may advantageously affect a flow profile of streams of material 12 through adjacent cavity sections 20*a-c*, such that tracks 12*a-c* of deposited material 12 on a substrate 24 may feature a homogeneous thickness profile on opposite edges of adjacent material tracks 12*a-c* at gaps G1, G2 associated with the flow guides 40*a*, 40*b*.

FIG. 5A, 5B illustrate examples of thickness measurements close to edges of tracks 12*a-c* of deposited material 12 close to gaps G1, G2 associated with flow guides 40*a*, 40*b*.

FIG. 5A illustrates an example of a measurement of the thickness of the deposited material 12 deposited with a die 14 comprising a shim 30*a* (shape sketched next to graph), in which the flow guides 40*a*, 40*b* are substantially straight, as a function of the distance along the width direction W from the gap G1, G2. The thickness is measured on both sides of the straight flow guides (4 measurements in total).

As can be seen in FIG. 5A, the measured thickness profile of the tracks 12*a-c* shows the thickness of the deposited material 12 raising up at the edge up to a bump section 54 in which the thickness of the material 12 raises towards a local maximum. Further towards the center of the tracks 12*a-c* along the width direction W, the thickness profile shows a depressed section 56, in which the thickness of deposited material 12 is lower than at a highest point of the bump section 54. The thickness of the material 12 then increases again along the width direction W away from the gap G1, G2 towards a plateau 58, in which the thickness of the deposited material 12 is substantially constant along the width direction W. The relative depression depth which may be defined as a ratio of the height of a bottom of the depressed section 56 to an average height of the plateau 58 may be used as a quality indicator for the thickness profile, and may be smaller than 90% using straight flow guides, as shown in some measurements.

FIG. 5B illustrates an example of a measurement of the thickness of the deposited material 12 deposited with a die 14 comprising a shim 30*b* (shape sketched next to graph) with the feature of the example shown in FIG. 4C. The thickness is plotted as a function of the distance along the width direction W from the gap G1, G2. The thickness is measured at both edges of adjacent tracks 12*a-c* at the gaps G1, G2 (4 measurements in total) defined by the flow guides 40*a*, 40*b* comprising both the widening side portion 50*a*, 50*b* and the recessed side portion 52*a*, 52*b*.

When compared to the example shown in FIG. 5A, none of the plotted thickness profiles show a pronounced bump 54, but at all four edges adjacent to the gaps G1, G2, the thickness profile increases substantially homogenously towards a plateau 58 in which the thickness of the deposited material 12 remains substantially constant. Accordingly, the flow guides 40*a*, 40*b* comprising the widening side portion 50*a*, 50*b* and/or the recessed side portion 52*a*, 52*b* may improve a homogeneity of the thickness profile at edges of adjacent tracks 12*a-c* of the deposited material 12. The improved thickness profile may improve a reliability of batteries when active material layers are deposited with a die 14 comprising the shims 30 with widening side portion 50*a*, 50*b* and/or recessed side portions 52*a*, 52*b*. The relative depression depth may be larger than 90%, using a corresponding die 14, as shown in some measurements.

FIGS. 6A-6E illustrate different examples of flow guides 40 comprising widening side portions 50. The flow guides 40 can extend from a support portion 39 of a shim 30 along the principal deposition direction 28, and in each of the illustrated flow guides 40, a width of a widening side portion 50 increases along the principal deposition direction 28 towards an opening 22 (not shown in FIGS. 6A-E, but arranged towards a top of the page) of a die 14, e.g. when a corresponding die 14 is fitted with a shim 30 comprising the flow guide 40.

FIG. 6A illustrates an example of a flow guide 40 comprising side 48 featuring a fixed slope with respect to the principal deposition direction 28, wherein the width of the widening side portion 50 increases linearly along the principal deposition direction 28 towards the opening 22, similar to the flow guides 40*a*, 40*c* in the examples of FIGS. 3A, 4A, and 4C. Accordingly, a width W6, W7 of the flow guide 40 along the width direction W, increases from a first flow guide width W6 towards a second flow guide width W7 along the principal deposition direction 28.

However, the shape of the widening side portion is not limited to a linear shape, e.g. with a side defining a fixed slope, but may have a different shape in some examples, wherein a slope of the side 48 may vary along the principal deposition direction 28.

For example, FIG. 6B illustrates an example of a flow guide 40 comprising a side 48 featuring a widening side portion 50, wherein the width of the widening side portion increases monotonically according to a smooth function having a concave shape along the principal deposition direction 28.

FIG. 6C illustrates an example of a flow guide 40 comprising side 48 featuring a widening side portion 50, wherein the width of the widening side portion 50 increases monotonically according to a smooth function having a convex shape along the principal deposition direction 28.

Further, the widening side portion 50 may also extend over a portion of the flow guide 40 along the principal deposition direction 28 wherein the widening side portion 50 extends over a length which can be smaller than a total extension of the flow guide 40 along the principal deposition direction 28.

For example, as shown in FIG. 6D, the flow guide 40 may comprise a widening side portion 50 (highlighted by a dashed line) in a portion of the flow guide 40, wherein the widening side portion 50 extends up to an end of the flow guide 40 next to the opening 22 (not shown in FIG. 6D).

The widening side portion 50 in the portion of the flow guide 40 may be implemented by an inclined section of the side 48, inclined with respect to the principal deposition direction 28, as shown in FIG. 6D, or may have a different profile such as one of the profiles shown in FIGS. 6B, 6C.

FIG. 6E shows a further example of a flow guide 40, wherein the width W6, W7 of the flow guide 40 varies non-monotonically along the principal deposition direction 28, but comprises a widening side portion 50 (highlighted by a dashed line), which extends up to an end of the flow guide 40 next to the opening 22, wherein the width of the widening side portion 50 increases monotonically according to a smooth function, i.e. a linear function.

An angle defined by the side 48a, 48b of the flow guide 40a, 40b at the widening side portion 50 and the principal deposition direction 28, e.g. for defining an incline of the side 48 in the examples of FIG. 6A, 6D, or 6E or a final incline of the side 48 close to the opening 22 in the other illustrated examples, may be 5° to 85°, or 10° to 80°, or 15° to 75°, or 20° to 60°.

An optimal angle for a sloped profile of a widening side section 50 for obtaining substantially flat thickness profile at an edge of a track 12b of material 12 may depend on a plurality of parameters, such as the flow rate of the material 12 through the die 14, a pressure in the cavity, a width or height of an adjacent cavity section 20a-c, or a combination thereof, just to give a few examples.

In the example of FIGS. 6A-6C, the width W6, W7 of the flow guide 40 may increase from a first flow guide width W6 towards a second flow guide width W7, wherein the second flow guide width W7 may be larger than the first flow guide width W6 by a factor of more than 1.5, and in particular more than 2, such as about 2, about 2.5, or about 3.5, or more. For example, the first flow guide width W6 in a base part of the flow guide 40, e.g. next to a support portion 39 of a shim 30, may be greater than 5 mm, such as 10 mm, 15 mm, or 20 mm, and the second flow guide width W7 at a distal end of the flow guide 40, e.g. at or next to an opening 22 of a die 14, may be greater than 20 mm, such as 30 mm, 35 mm or 40 mm. For example, the first flow guide width W6 may be 17 mm and the second flow guide width W7 may be 34 mm, or the first flow guide width W6 may be 10 mm and the second flow guide width W7 may be 36 mm, when an extension of the flow guide 40 is about 100 mm.

The inclination of the sides 48a, 48b of neighboring flow guides 40a, 40b facing towards a common adjacent cavity section 20b may be different in some examples, such as to adjust a thickness profile on opposite edges of a track 12b of material 12.

FIG. 7A-7F illustrate different examples of flow guides 40 comprising recessed side portions 52 (highlighted by dashed lines) at a side 48 of the flow guide 40, wherein the views illustrate the flow guides 40 according to cross sections through the respective flow guide 40 perpendicular to the principal deposition direction 28 (along the plane of projection in FIGS. 7a-7E).

A thickness H1 of the flow guide 40 in the recessed side portion 52 along the height direction H is reduced with respect to a center thickness H2 in a center portion of the flow guide 40. The recessed side portion may extend along the width direction W over a lateral extension W8, in which the thickness H1 of the flow guide 40 may vary along the width direction W.

In the example of FIG. 7A, the recessed side portion 52 is formed by a step, wherein the thickness of the flow guide 40 starts at an intermediate thickness H1 and is constant over the lateral extension W8 of the recessed side portion 52. The thickness H1 may be about half the center thickness H2 of the flow guide 40. However, the thickness H1 of the flow guide 40 at the step may also have different values, such as between 20% and 80% of the center thickness H2 or between 30% and 70% of the center thickness H2, e.g between 40% and 60% of the center thickness H2. The lateral extension W8 of the recessed side portion 52 may be similar to the center thickness H2 of the flow guide 40, such as between 50% of the center thickness H2 and twice the center thickness H2.

In the example of FIG. 7B, the recessed side portion 52 also comprises a step, wherein the thickness of the flow guide 40 starts at an intermediate thickness H1, but varies over the lateral extension W8 of the recessed side portion 52 up to the center thickness H2 according to a smooth function, which has a concave shape in the illustrated example.

In the example of FIG. 7C, the thickness of the flow guide 40 in the recessed side portion 52 is a smooth monotonic function from a thickness of substantially zero to the center thickness H2 over the lateral extension W8. The thickness of the flow guide 40 increase along the width direction W up to an intermediate step with an intermediate height H1, wherein the thickness of the flow guide 40 remains substantially constant, and the thickness of the flow guide 40 may then increase again along the width direction W up to the center thickness H2, as shown in FIG. 7C.

The examples of FIGS. 7D-7F show similar examples to the example of FIG. 7C, but the thickness of the flow guide 40 varies according to a smooth function with a shape, which may be strictly convex, concave, and linear, respectively.

The skilled person will appreciate that further modifications are evident in view of the preceding description, wherein features of the widening side portions 50, 50a, 50b may be combined with or adapted towards the recessed side portions 52, 52a, 52b. For example, the recessed side portions 52, 52a, 52b may extend over a portion of the flow guides 40, 40a, 40b which may be smaller than a total extension of the flow guides 40, 40a, 40b along the principal deposition direction 28. Further, different recessed side portions 52a, 52b of a shim 30 may feature different cross sections, such as different intermediate thicknesses H1 of a step at sides 48 of different flow guides 40a, 40b, such as to adjust a thickness profile of different edges of a deposited layer of material 12. Moreover, the recessed side portions 52, 52a, 52b may also define a C- or W-shaped edge, with a recess extending along the width direction W into the side 48 of the flow guide 40, such that the side 48 may feature a plurality of protrusions when viewed along the principal deposition direction 28.

Further, the flow profile of the material 12 in the cavity 20 may be adapted by providing the lateral prongs 42 of the shim 30 with widening side portions 50, 50a, 50b and/or recessed side portions 52, 52a, 52b.

Figure 8:
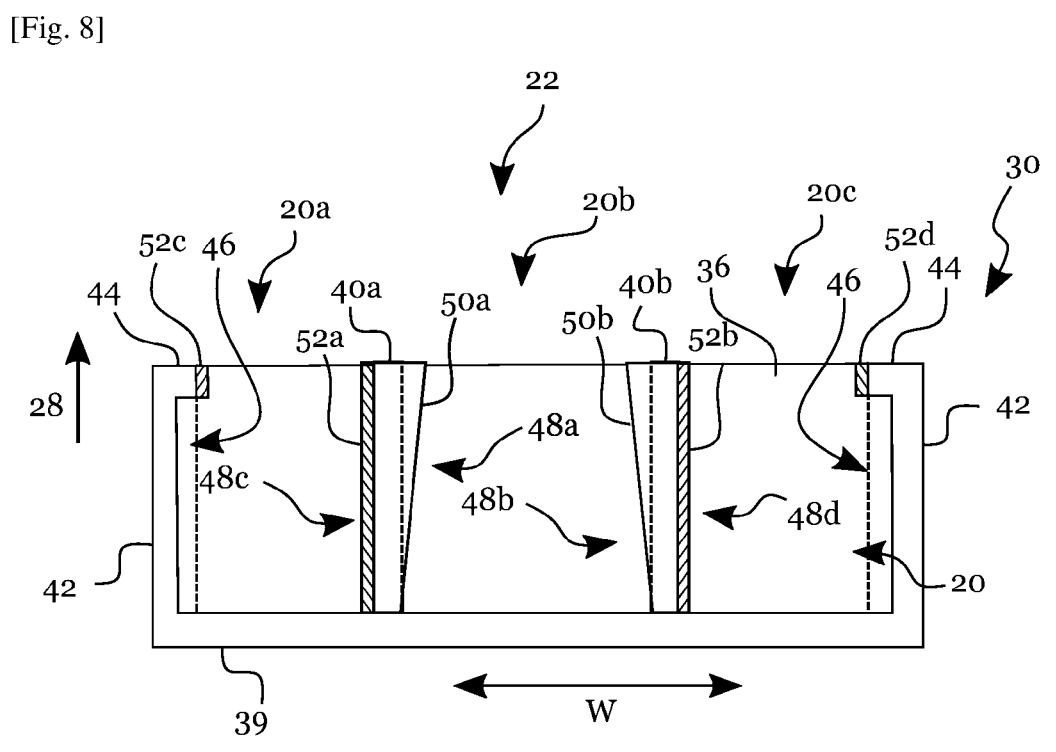

For example, as illustrated in the example of FIG. 8, which features flow guides 40a, 40b with widening side portions 50, 50a, 50b and/or recessed side portions 52, 52a, 52b arranged as in the example of FIG. 4C, the lateral prongs 42 may be provided with recessed side portions 52c, 52d arranged at lateral protrusions 44 protruding laterally from the lateral prongs 42 at an end of the lateral prongs 42 close to the opening 22. The recessed side portions 52c, 52d arranged at lateral protrusions 44 of the lateral prongs 42 may adjust a flow profile close to lateral edges of the opening 22 (i.e. with respect to the width direction W), such as to optimize a thickness profile at outer edges of a deposited layer of material 12.

The skilled person will appreciate that although only two flow guides 40, 40a, 40b separating the cavity 20 into multiple cavity sections 20a, 20b are shown in the illustrated examples, in principle any number of flow guides 40, 40a, 40b may be used in other examples. The system 10 discussed in the preceding examples may be adapted to manufacture different batteries with desirable properties, such as a desired capacity or physical foot print, and the die 14 and a corresponding shim 30 may be adapted to manufacture said batteries. For example, the die 14 may feature an opening which may have a width on the order of millimeters, centimeters decimeters or meters, depending on a desired footprint of the battery. Further, a height of the cavity 20 formed in the die 14 and corresponding properties of the shim 30 may be selected according to a desired thickness of a deposited layer of material 12, such as a coating thickness of an active electrode material 12 on an electrode substrate 24, which may have an average thickness on the order of a few micrometers to a few millimeters, depending on the properties of the manufactured battery.

Further, a die 14 may comprise a plurality of openings 22, such as to deploy a multilayer structure of extruded material 12 onto a substrate 24. For example, a die 14 may comprise and upper die portion 16, a lower die portion 18, and an intermediate die portion (not shown), and the upper die portion 16 may be separated by a first shim 30 from the intermediate die portion to form a first cavity 20 and the intermediate die portion may be separated by a second shim 30 from the lower die portion 18 to form a second cavity 20. The first and second shims 30 may have different shapes, and may in particular differ by a shape of an inclined widening side portion 50, 50*a*, 50*b*, such as a slope of an inclined widening side portion 50, 50*a*, 50*b*, or a lateral extension W8 or intermediate thickness H1 of a recessed side portion 52, 52*a*, 52*b*, e.g. with a step profile.

In the manufacturing of a battery, different shims 30 may be used for defining a width and/or thickness profile of a active positive electrode material 12 and a active negative electrode material 12. For example, a shim 30 for depositing a active negative electrode material 12 may differ from a shim 30 for depositing a active negative electrode material 12 by the properties of the respective widening side portions 50 and/or recessed side portions 52. As a specific example, a widening side portion 50 of a flow guide 40 of a shim 30 for depositing a active negative electrode material 12 may have a lower inclination than the corresponding widening side portion 50 in a shim 30 for depositing a active positive electrode material 12. As a further example, the recessed side portions 52 of a flow guide 40 of a shim 30 for depositing a active negative electrode material 12 may have a greater lateral extension W8 or a lower intermediate height H1 than the corresponding recessed side portion 52 in a shim 30 for depositing a active positive electrode material 12. As a result, a coating of active negative electrode material 12 may effectively extend over a greater width than a coating of active positive electrode material 12, and/or may have a larger thickness at the edges of the respective coatings.

The description of the preferred embodiments and the figures merely serve to illustrate the invention and the beneficial effects associated therewith, but should not be understood to imply any limitation. The scope of the invention is to be determined solely by the appended claims.

The invention claimed is:

1. A system for depositing a material, the system comprising a die for extruding the material along a principal deposition direction through an opening of the die, the die including:

a cavity fluidly connected to the opening; and a flow guide configured to extend through the cavity towards the opening to shape a flow of the material extruded via the opening, the flow guide having a first side that includes a widening side portion, wherein a width of the widening side portion increases along the principal deposition direction towards the opening, wherein the flow guide includes a second side opposite the first side, and wherein at least one of the first side and the second side of the flow guide includes a recessed side portion such that a thickness of the flow guide in the recessed side portion in a height direction is smaller than a center thickness of the flow guide in a center of the flow guide.

2. The system of claim 1, wherein the widening side portion is located adjacent the opening.

3. The system of claim 2, wherein the widening side portion extends along an entirety of the first side of the flow guide.

4. The system of claim 1, wherein the width of the widening side portion monotonically increases towards the opening along the principal deposition direction.

5. The system of claim 1, wherein the first side of the flow guide is inclined with respect to the principal deposition direction such that the width of the widening side portion linearly increases towards the opening.

6. The system of claim 1, wherein the first side of the flow guide faces towards a center of the die.

7. The system of claim 1, wherein the recessed side portion is located in the second side of the flow guide.

8. The system of claim 1, wherein the recessed side portion is located adjacent the opening.

9. The system of claim 1, wherein the recessed side portion extends along an entirety of the at least one of the first side and the second side of the flow guide.

10. The system of claim 1, wherein a cross-section of the flow guide at the recessed side portion comprises one of a linear incline, a convex shape, a concave shape, or a step with an intermediate thickness with respect to a center thickness of the flow guide.

11. The system of claim 1, wherein the recessed side portion faces away from a center of the die.

12. The system of claim 1, wherein the die further comprises:

a manifold in communication with the cavity, the manifold being configured to distribute material over a width direction of the die perpendicular to the principal deposition direction; and a feed port in communication with the manifold, the feed port being configured to provide the material to the manifold.

13. The system of claim 1, wherein the system further comprises a guide plate separate from the die, the guide plate including a support portion and the flow guide, the support portion being arranged inside the cavity such that the flow guide extends from the support portion to the opening of the die.

14. The system of claim 1, wherein the flow guide includes a second side opposite the first side, and wherein the flow guide is arranged in the cavity such that the material passes along both the first side and the second side of the flow guide towards the opening when the system extrudes the material through the opening.

15. A manufacturing system for manufacturing a secondary battery, the manufacturing system comprising the system of claim 1, wherein the material is an active positive electrode material for the secondary battery.

16. A method for manufacturing a second battery, the method comprising:

providing a material to the system according to claim 1; and depositing the material on a substrate through the opening in the die.

\* \* \* \* \*